United States Patent [19]

Duke

[11] Patent Number: 4,508,188
[45] Date of Patent: Apr. 2, 1985

[54] GARDEN AND LAWN TRACTOR

[76] Inventor: George B. Duke, 252 Kingsale Rd., Suffolk, Va. 23437

[21] Appl. No.: 383,104

[22] Filed: May 27, 1982

[51] Int. Cl.³ ............................................. B62D 61/06
[52] U.S. Cl. ..................................... 180/210; 180/900
[58] Field of Search ................. 180/6.66, 53 D, 54 D, 180/72, 210, 332, 900, DIG. 2; 280/96.1

[56] References Cited

U.S. PATENT DOCUMENTS

| | | | |
|---|---|---|---|
| 2,051,289 | 8/1936 | Custer | 180/210 |
| 2,066,666 | 1/1937 | Becker | 180/210 |
| 2,262,876 | 11/1941 | Baker et al. | 180/900 |
| 2,788,858 | 4/1957 | Aasland et al. | 180/900 |
| 2,859,579 | 11/1958 | Peck | 180/210 |
| 2,892,505 | 6/1959 | Goodwin | 180/6.66 |
| 2,989,134 | 6/1961 | Kamlukin et al. | 280/96.1 |
| 3,187,821 | 6/1965 | Kamlukin | 180/900 |

FOREIGN PATENT DOCUMENTS

| | | | |
|---|---|---|---|
| 2820451 | 1/1979 | Fed. Rep. of Germany | 180/900 |
| 507880 | 9/1920 | France | 180/210 |

*Primary Examiner*—Joseph F. Peters, Jr.
*Assistant Examiner*—Ross Weaver
*Attorney, Agent, or Firm*—Newton, Hopkins & Ormsby

[57] ABSTRACT

A riding, self propelled tractor primarily for earthworking operations in the garden but also having lawn mowing and lawn care capabilities has a rear mounted engine with a rear traction wheel assembly beneath the engine and front wide stance laterally adjustable steering wheels enabling the tractor to operate along row crops. An implement support near the front of the tractor in clear view of the operator includes a parallelogram lift for diverse easily interchangeable earthworking implements and a lawn mower attachment. A simplified belt transmission having forward and reverse drive capabilities eliminates all gear shifting and foot operated assist clutch pedals. Increased ground clearance is achieved.

2 Claims, 16 Drawing Figures

GARDEN AND LAWN TRACTOR

BACKGROUND OF THE INVENTION

Numerous riding garden tractor and lawn mower configurations are known in the prior art. Generally speaking, the prior art machines are manufactured primarily for lawn mowing, but in some cases have the secondary capability for earthworking in the garden. Usually, the engine is located in a forward position relative to the operator and earthworking implements are mounted rearwardly of the operator, making it very difficult for the operator to observe the operation and positioning of implements while driving the tractor. Usually, the prior art machines have minimal ground clearance, restricting their use to the cultivation of only the smallest of row crops, and usually there is no provision for adjustment of wheel tread width which further limits the versatility of the machine for said tilling and cultivating. The customary provision of a gear transmission or differential, or both, increases manufacturing costs as well as the cost of maintenance.

These and other recognized drawbacks of prior art garden tractors are eliminated in the invention in accordance with a principal object of the invention through provision of a much more versatile garden tractor which is more convenient to operate with expected lower maintenance cost over a long period of time. The tractor can mount diverse earthworking implements interchangeably by the mere manipulation of two mounting bolts on a sturdy parallelogram implement frame or lift in clear view of the tractor operator. A lawn mower attachment can also be mounted and driven through a power take-off system by the tractor engine.

A simplified main frame consists essentially of a center longitudinal high ground clearance single beam on which the engine and associated power transfer train are mounted rearwardly of the tractor operator's seat. The tractor has a tricycle configuration with dual traction wheels thereof disposed rearwardly, beneath the engine, and the two wide stance laterally adjustable steering wheels disposed at the front of the machine supporting the front of the main frame. The diverse implement mount is at an intermediate location somewhat forwardly of the operator's seat.

Other features and advantages of the invention will become apparent during the course of the following detailed description.

DETAILED DESCRIPTION

Referring to the drawings in detail wherein like numerals designate like parts, a garden and lawn tractor according to the invention includes a main frame consisting essentially of a center longitudinal beam or member 25 at a sufficient elevation to provide substantial ground clearance enabling the tractor to pass over various row crops. On a rear sub-frame portion 26, FIG. 12, of main frame member 25 is mounted an engine 27 and associated drive train components, to be described in full detail. The engine and drive components shown particularly in FIGS. 2 and 3 power a preferably dual rear traction wheel 28 of the tractor which is located directly below the engine and support the rear end of frame member 25 including sub-frame 26.

Figure 9:
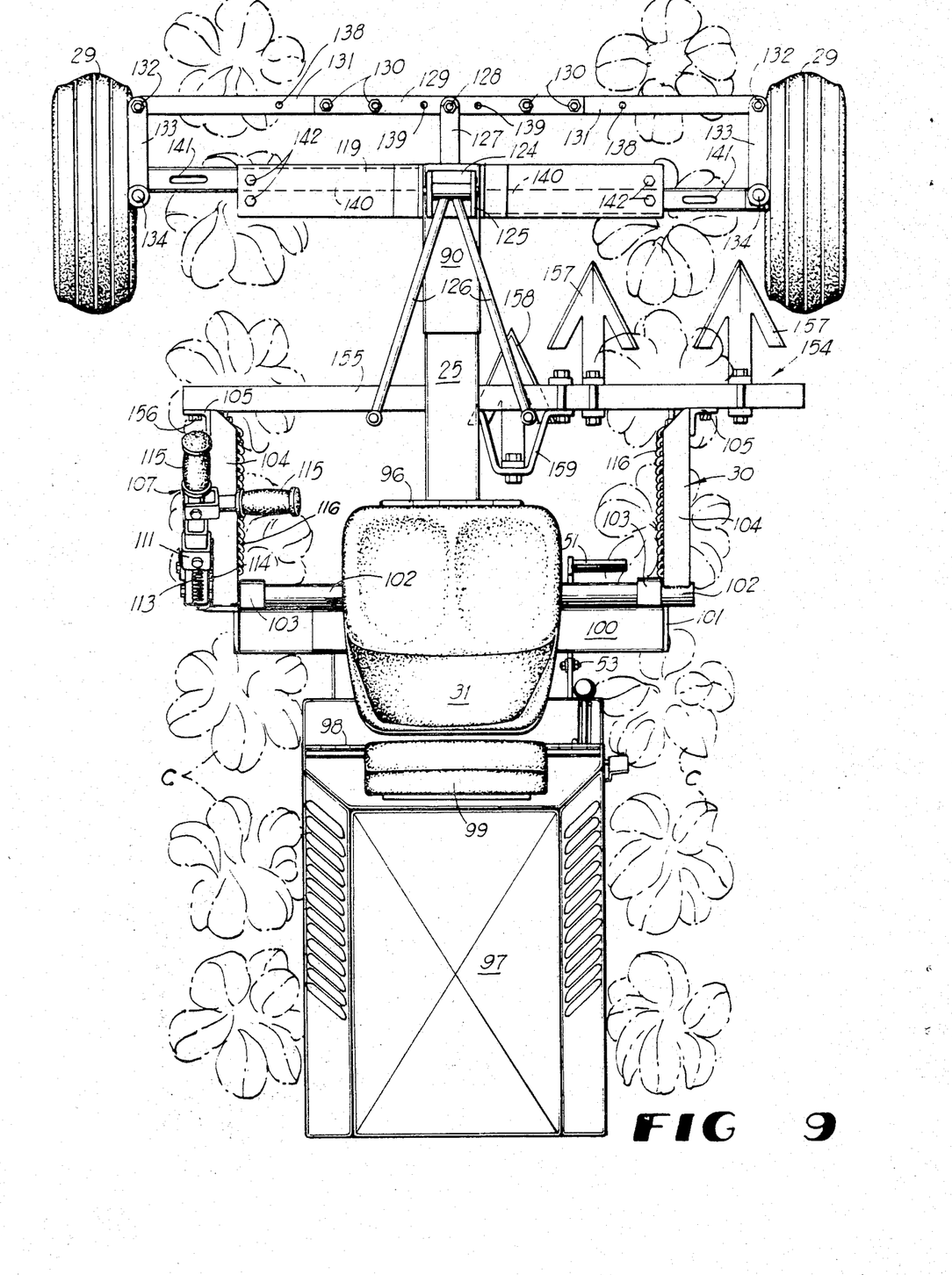
FIG. 9 is a plan view of the tractor as shown in FIG. 8.

The tractor has a three wheel configuration, FIG. 9, and relatively smaller wide stance laterally adjustable front steering wheels 29 and axle structure, to be described in detail, support the front of frame member 25.

Rearwardly of front steering wheels 29 and substantially forwardly of the engine 27 and rear traction wheels 28 is a mount 30 for diverse earthworking attachments and a lawn mowing attachment, to be described. An operator's seat 31 immediately ahead of the rear engine enclosure 32 is located to position the operator comfortably and efficiently with respect to all controls on the tractor and with a clear view of implements and the lawn mower attachment selectively held by the mount 30.

Power from the engine 27 is delivered to the dual traction wheel 28 without the usual gear transmission and/or differential gear, and consequently without the necessity for shifting gears at any time. The engine 27 includes a power output shaft 33 to which is fixed a sprocket 34, engaged with and driving a chain 35. This chain is driven counterclockwise, FIG. 3, and drives an idler sprocket 36 mounted on a reverse motion shaft 37. The chain 35 also engages and drives another sprocket 38 mounted on a power take-off shaft 39 which also revolves counterclockwise, FIG. 3. The two sprockets 38 and 36 are the forward and reverse prime movers of the tractor drive, respectively.

Mounted forwardly of the engine 27 within the enclosure 32 is a transverse power transfer shaft 40 to which is fixed a sprocket 41. This sprocket drives a chain 42 in FIG. 3, which chain engages a sprocket 43 which, in turn, is fixed to another transverse power transfer shaft 44. Fixed to this shaft 44 is a smaller sprocket 45 engaged by a chain 46 driving a final sprocket 47, fixed to the axle 48 of dual rear traction wheel 28. An idler sprocket 49 is provided in engagement with the chain 46 to take up slack in this chain adjustably.

Figure 2:
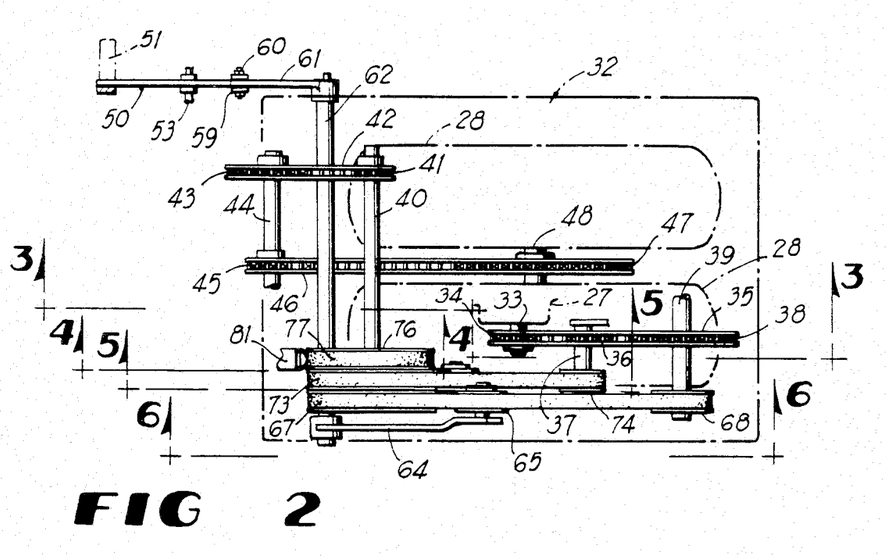
FIG. 2 is a fragmentary horizontal section taken on line 2—2 of FIG. 1 showing drive train components.
Figure 3:
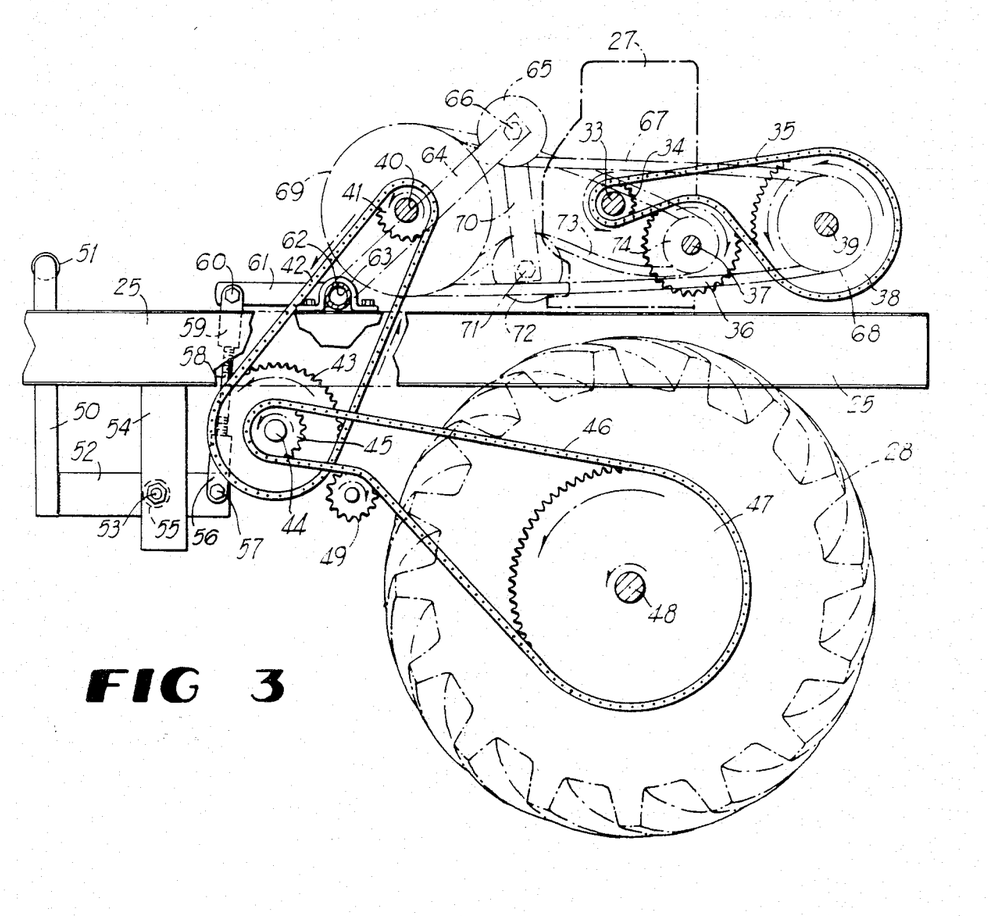
FIG. 3 is an enlarged fragmentary vertical section taken on line 3—3 of FIG. 2.
Figure 5:
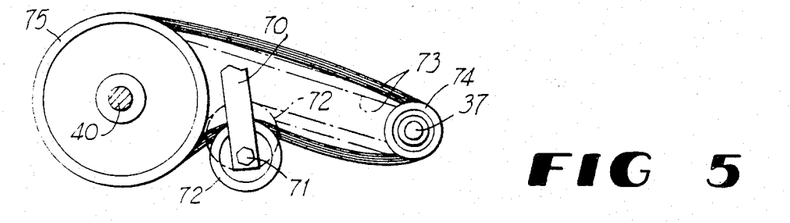
FIG. 5 is a similar section taken on line 5—5 of FIG. 2.
Figure 6:
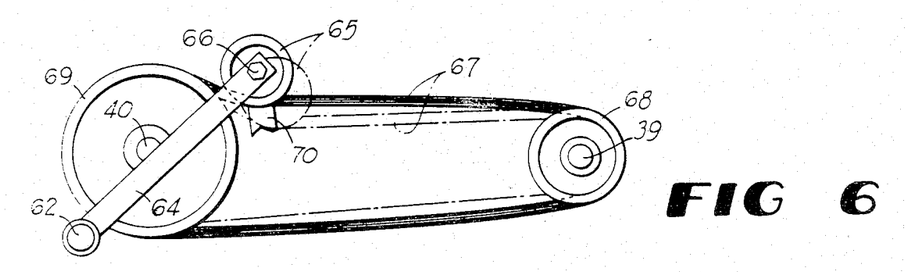
FIG. 6 is a similar section taken on line 6—6 of FIG. 2.

The foregoing sprocket chain drive shown in FIG. 3 comprises the fixed position components of the drive train for propelling the tractor. For selectively achieving forward or reverse movement of the tractor, a unique pulley and belt mechanism is employed between the forward and reverse motion shafts 39 and 37 and the power transfer shaft 40. This mechanism in its entirety is shown in FIG. 2 and portions of it are shown in FIGS. 5 and 6.

Again referring to FIGS. 2 and 3, a forward and reverse selector lever 50 is provided having a handle 51 which is shown in a neutral position. Forward movement of this handle 50 by the operator engages the forward motion pullies and belts, and rearward movement of the handle engages the reverse movement pullies and belts.

Motion selector lever 50 carries a lower extension 52 rigid therewith which is pivoted at 53 to a frame member 54. At the pivot 53, the lever 50 is held between spring-loaded friction plates 55 which tend to retain the lever in any selected position of adjustment. Movement of the lever 50 forwardly or rearwardly from the illustrated neutral position gradually increases the ground speed of the tractor until the lever reaches an extreme position in either direction.

Rearwardly of pivot 53, a lower yoke 56 is attached at 57 to extension 52. The lower yoke threadedly receives an adjustable actuator rod 58 whose upper end is connected to an upper threaded yoke 59, bolted at 60 to a lever arm 61 fixed to a transverse rotary shifter shaft 62. The shaft 62 is journaled in pillow blocks 63, FIG. 3, and attached to the opposite end of shaft 62 is a shaft lever 64 shown in phantom lines in FIG. 3. The shaft lever is shown in full lines in FIG. 6.

An idler sheave 65 is fixed to the lever 64 at 66. Referring to FIG. 6, the sheave 65 overlies a V-belt 67 which is engaged around a forward motion power take-off pulley 68, fixed to the previously-described forward motion shaft 39, and then engaged with a pulley 69 fixed to take-off shaft 40.

Fixed by bolt 66 to the rear side of sheave 65 is a linkage arm 70 shown in both FIGS. 5 and 6, FIG. 5 being an isolated view of the reversing mechanism. Linkage arm 70 is connected at bolt 71 to an idler sheave 72 which underlies a V-belt 73. The belt 73 engages a reverse motion power take-off pulley 74 fixed to the previously-described reverse motion shaft 37, and then engages a reverse motion take-off pulley 75 which is fixed to the shaft 40.

In operation, when handle 51 is urged forwardly, forward motion idler sheave 65 tightens V-belt 67, as shown in phantom lines in FIG. 6, to transmit the power from forward motion shaft 39 to traction wheels 28 via the drive train previously described. When handle 51 is pulled rearwardly, reversing idler pulley 72 tightens V-belt 73 as shown in phantom lines in FIG. 5 and power is transferred from reversing shaft 37 to traction wheels 28 via the drive train.

Figure 4:
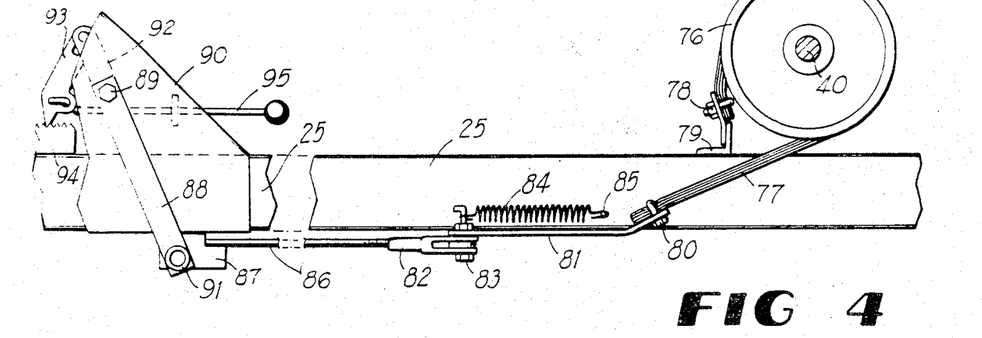
FIG. 4 is a similar section taken on line 4—4 of FIG. 2.

Continuing along transfer shaft 40, FIG. 2, and referring to FIG. 4, another pulley 76 is fixed on the shaft 40. This latter pulley is provided to form a mechanical brake on the power transfer shaft 40. A belt section 77, FIG. 4, engages around pulley 76 and is anchored at 78 to an angle member 79 fixed to the main frame 25 of the tractor. The other end of belt section 77 is connected at 80 to a link 81. A threaded connector 82 is connected at 83 to the other end of link 81. A brake return spring 84 is connected between the element 83 and a stationary anchor 85 on main frame 25. A brake control rod 86 is threaded into connector 82 and is fixed to a pedal block 87. The block 87 in turn is fixed to a brake lever 88, pivoted at 89 to a steering cowling 90. A brake pedal 91 is fixed to the lower end of brake lever 88 for applying foot pressure required to slow or stop the tractor at certain times. The pedal 91 is locked when foot pressure is applied to it preventing forward or rearward movement of the tractor. The brake is not used normally in slowing or stopping the tractor, and this is ordinarily accomplished by using the forward/reverse handle 51. The foot operated brake system is for emergency and parking usage. Accordingly, inboard of lever 88, and fixed to shaft 89 is an extension lever 92 equipped with a pivoted pawl 93 which engages a rack bar 94 on frame member 25. When the emergency brake is applied, the rack and pawl arrangement retains the brake in the locked position. A releasing rod 95 is provided which is attached to the pawl 93 and extends through a guide aperture in the cowling 90, whereby the brake locking pawl 93 can be manually released to allow return of the brake lever 88 by the spring 84 to the non-braking position.

Returning to the general construction of the tractor, the operator's seat 31 is hinged at its forward edge by a transverse axis hinge 96 which enables the seat to be swung forwardly nearly 180° when it is desired to open a hood 97 provided on the engine enclosure or cowling 32, the hood having a transverse axis hinge 98. Preferably an upper backrest 99 is provided on the front of the hood 97 to further the comfort of the operator.

Substantially below the operator's seat is the aforementioned implement mount 30 forming an important aspect of the invention. The mount 30 includes a sturdy crossbar 100 rigid with longitudinal frame member 25 and extending equidistantly on opposite sides thereof at right angles thereto, FIG. 9. A pair of angle members 101 are fixed dependingly to each end of crossbar 100 forming a rigid inverted U-frame near the longitudinal center of frame member 25. A pair of transverse tubes 102 are pivotally mounted on the angle members 101 by means of a double-ended hanger strap 103 bolted to each angle member 101. Welded to each end of the upper and lower tubes 102 are parallelogram arms 104 which carry at their forward ends a pair of vertical implement support bars 105. A link 106 is connected diagonally between the lower parallelogram arms 104 and a manual control lever 107 near the side of the operator's seat 31 opposite from the forward/reverse handle 51.

The link 106 is slotted, as shown, and bolted at 108 to enable fine adjustment of the heights of arms 104. The link 106 at its upper end is bolted at 109 to the control lever 107 whose lower end is pivoted at 110 to the tractor frame.

The control lever 107 has a square collar 111 thereon telescopically. This collar carries a tooth-engaging tang 112 urged by a spring 113 into engagement with the teeth of an arcuate toothed sector 114 closely adjacent to the collar 111. This arrangement positively maintains the desired height of the parallelogram implement mount 30 set by the operator by use of the control lever 107. The two right angular handles 115 on the control lever 107 are for the convenience of the operator, and either handle may be utilized to engage or disengage the tang 112 with the teeth of plate or sector 114, whereby the control lever 107 can be swung to a new position to raise or lower the implement mount 30.

A pair of large coil springs 116 is connected between the lower arms 104 and the upper arm 104. These springs preload the implement mount upwardly and greatly aid the operator in overcoming the weight of the mount 30 and any implement attached thereto. Additionally, slots 117 are provided on the upper parallelogram arms 104 to allow adjustment of the bolts 118 at the tops of bars 105, thus enabling some adjustment of the inclination of the bars 105 of the implement mount and, in turn, of the implement attached thereto.

Figure 8:
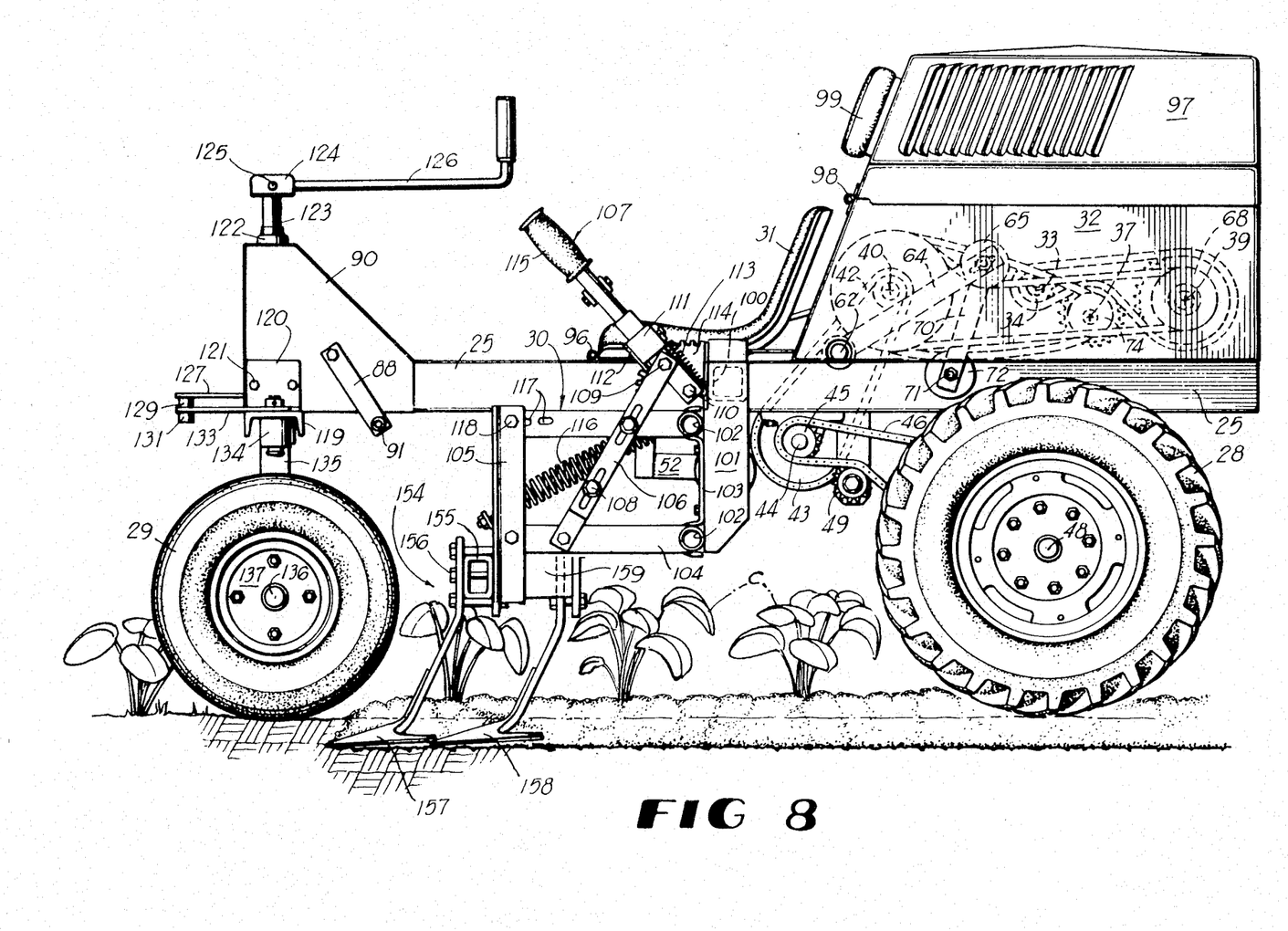
FIG. 8 is a side elevation of the tractor depicting the cultivation of a crop row by means of shanks and sweeps.

Referring particularly to FIGS. 8 and 9, the tractor steering mechanism is seen to comprise a transverse channel beam 119 fixed to the forward end of longitudinal main frame member 25 and extending equidistantly on opposite sides thereof, at right angles thereto. The beam 119 is secured to the frame member 25 by angles 120 and bolts 121. The cowling 90 forms a housing within which is mounted a vertical axis bearing 122 serving to journal a steering column 123 atop which is welded a U-bracket 124 apertured to receive a crosspin 125 of a bifurcated steering handle 126 arranged for easy grasping by an occupant of the seat 31. The pin 125 forms a transverse axis pivot for the steering handle 126 allowing the latter to be swung forwardly when the seat 31 is swung forwardly on the axis of hinge 96, which in turn makes room for the opening of the hood 97 by swinging it forwardly on the axis of hinge 98.

At its lower end, a steering control arm 127 is welded to the steering column 123. This arm is bolted at 128 to an apertured steering link 129 which in turn is bolted at 130 to right and left hand steering links 131. The links 131 are bolted at 132 to control arms 133 which are fixed to vertically journaled wheel stanchions 134. These stanchions in turn are fixed to depending front wheel support members 135 to which the front wheel axles 136 are secured, rotatably supporting the hubs 137 of front steering wheels 29.

As best shown in FIG. 9, the links 131 are apertured at 138. The steering link 129 is similarly apertured at 139. Also, the front wheels 29 are mounted on laterally adjustable frame members 140 via apertures 141 receiving locking bolts 142. When the tractor is carrying certain attachment implements, to be described, it may be desirable, for example, to position the right front wheel further outwardly from the frame member 25 while the left front wheel is positioned further inwardly from the wheel positions shown in FIG. 9. The described construction allows either or both front wheels 29 to be adjusted inwardly or outwardly from two extreme positions to accommodate the various attachments with which the tractor is provided.

Figure 1:
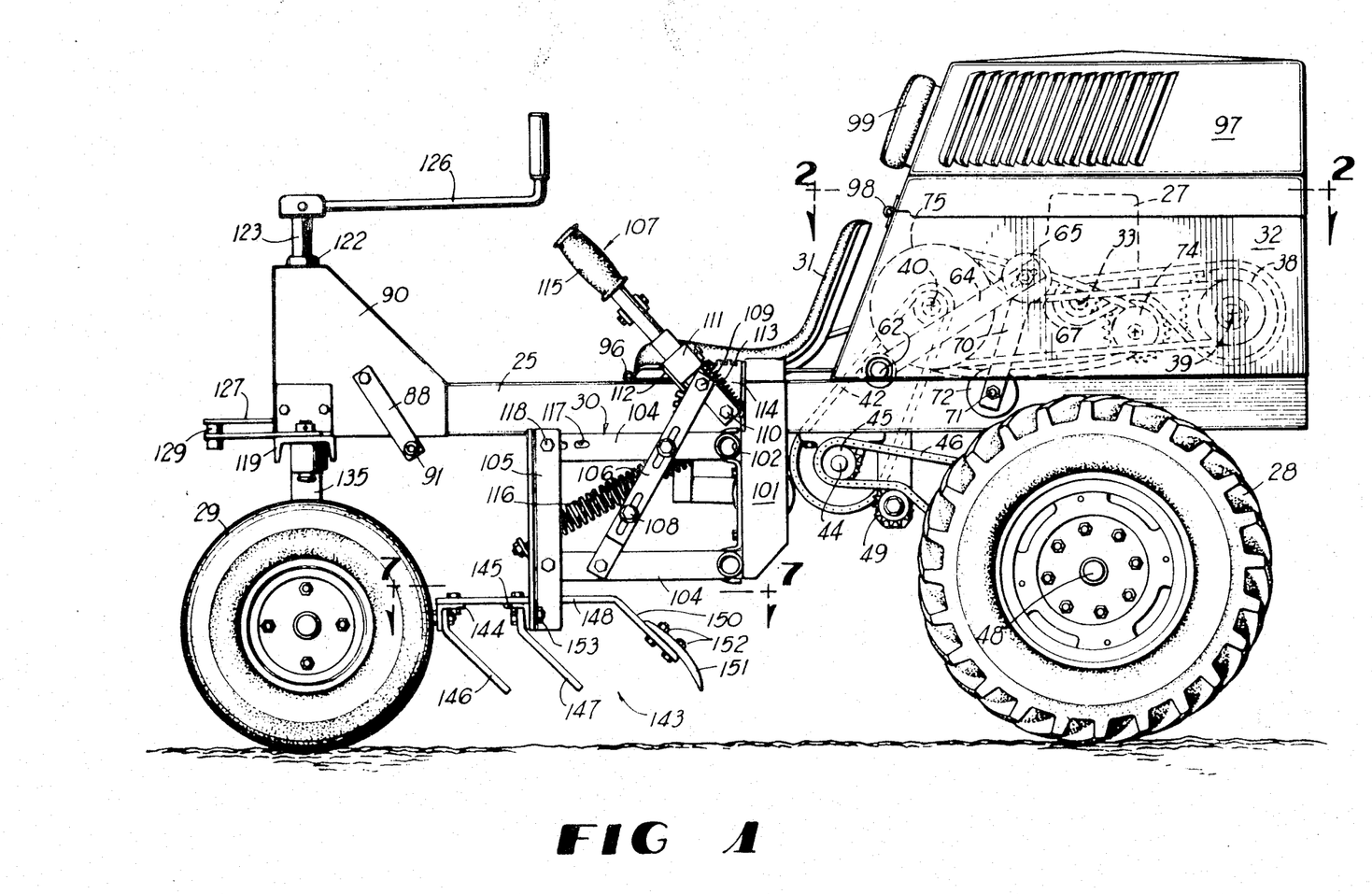
FIG. 1 is a side elevation of a riding garden tractor according to the invention.
Figure 7:
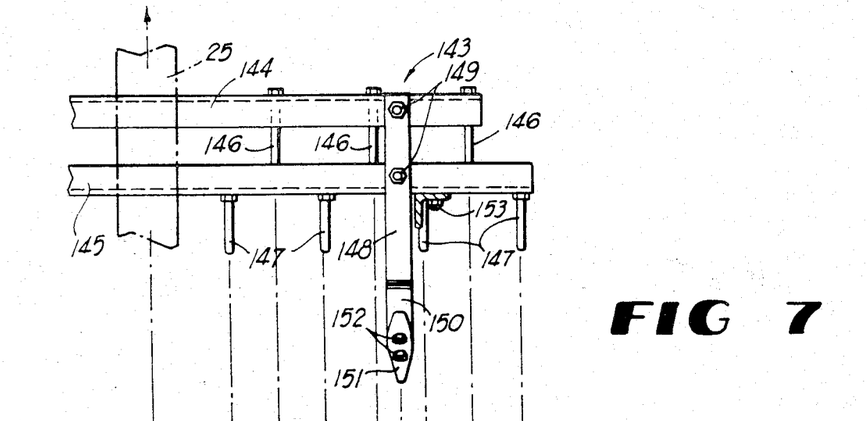
FIG. 7 is a fragmentary horizontal section taken on line 7—7 of FIG. 1.

The first of these attachments indicated by the numeral 143, FIG. 1, is a spike tooth harrow with cultivator hoe. This implement is also shown in FIG. 7. It consists of a pair of transverse angle bars 144 and 145. The forward bar 144 carries tines 146 and similar tines 147 carried by the rear bar 145 are staggered laterally relative to the tines 146, FIG. 7

Tool bars 148 are secured to the two bars 144 and 145 by bolts 149. The rear portions of tool bars 148 are angled downwardly at about 45° to the vertical as shown at 150 and these extensions have cultivator hoes 151 fixed thereto by bolts 152.

The tines 146 and 147 are fixed to the angle bars 144 and 145 by welding, and a single pair of bolts 153 is employed to mount the harrow attachment 143 removably on the implement support bars 105 of mount 30. This is a major convenience feature whereby only one pair of bolts requires manipulation in order to mount or demount the various attachment implements. It should be understood that FIG. 7 depicts only one-half of the harrow attachment and the other half thereof is a mirror image of the elements shown in FIG. 7.

FIGS. 8 and 9 illustrate the tractor equipped with a second attachment implement 154 in the nature of a cultivator. This attachment comprises a sturdy tool bar 155 attached by a single pair of mounting bolts 156 to the support bars 105 of the implement mount 30. The tool bar 155 carries cultivator sweeps 157 in spaced relationship, FIG. 9, to straddle a row of crops C. A third cultivator sweep 158 can be placed inwardly and rearwardly of the adjacent front sweep 157 and secured to the tool bar via a bracket means 159.

The arrangement shown in FIG. 9 enables the cultivating of one crop row C, or the sweeps may be positioned on the tool bar 155 to cultivate the entire area between two adjacent crop rows. Earthworking elements other than sweeps may also be mounted on the tool bar to increase the versatility of the attachment. With the cultivator attachment 154 in place on the tractor, the two front wheels 29 are in their maximum width positions, as shown in FIG. 9. The front wheels are straddling two crop rows and the rear traction wheel 28 is between the two rows.

Figure 10:
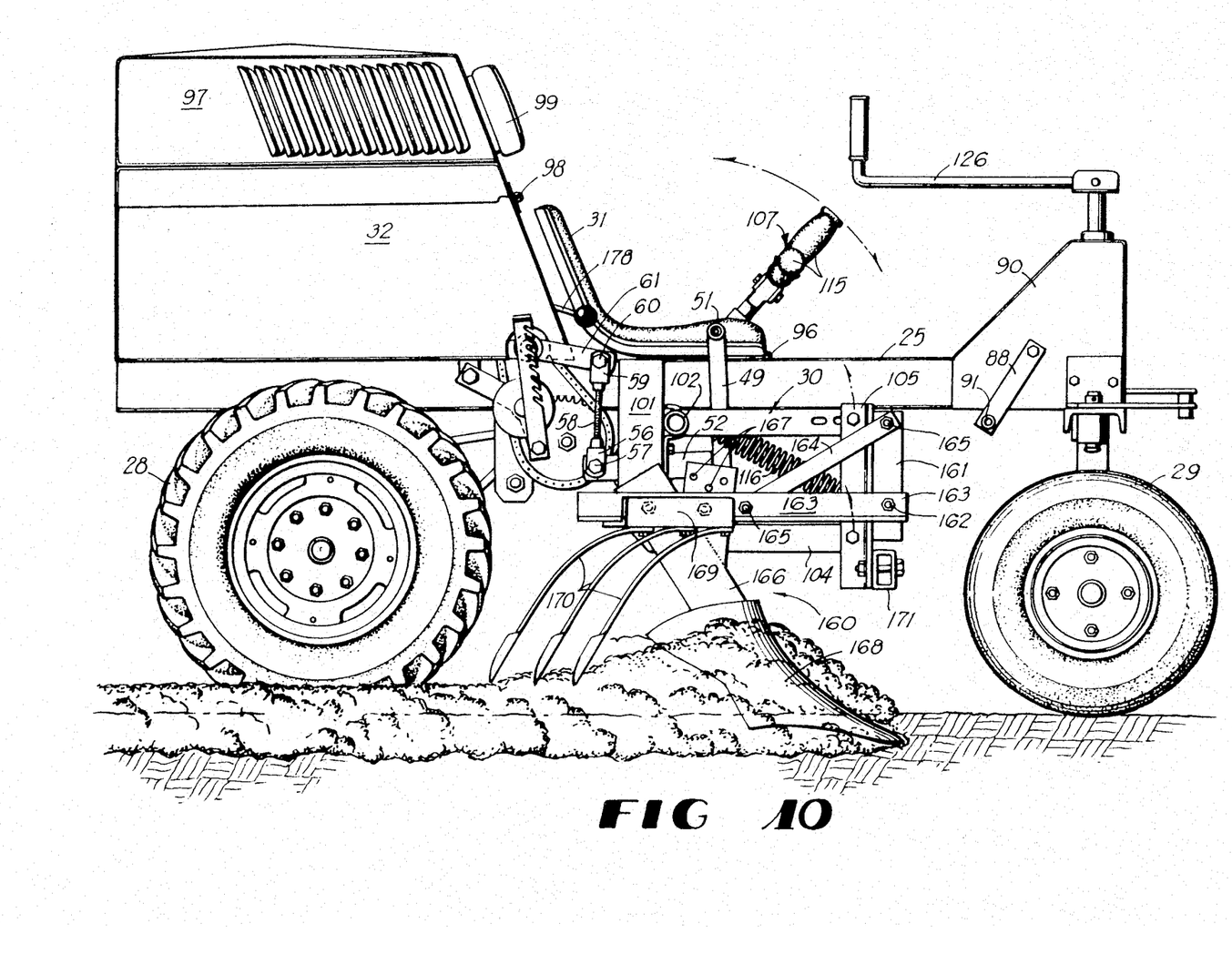
FIG. 10 is an opposite side elevation of the tractor showing a moldboard plow attachment mounted thereon.

The third attachment implement shown at 160 in FIG. 10 comprises a moldboard plow. This attachment comprises a vertical angle member 161 bolted to implement support bar 105 of implement mount 30. The angle member 161 is attached at bolt 162 to a horizontal mounting bar 163 braced by a strut 164 anchored by bolts 165. Attached to mounting bar 163 is a plow frame member 166 having adjustment apertures 167. Fixed to the frame 166 is the moldboard plow foot 168. Secured by bolts to the plow mounting frame is a member 169 to which are attached dependingly tines 170 in trailing relationship to the plow foot 168 for smoothing out the mound of soil turned up by the plow foot. A forward tool bar 171 remains in place to add strength and rigidity to the parallelogram mount 30. While not shown in FIG. 9, the right front wheel 29 is adjusted to its outermost lateral position in the plowing mode while the left front wheel is in its innermost position. The moldboard plow attachment is on the right hand side of the mount 30.

Figure 11:
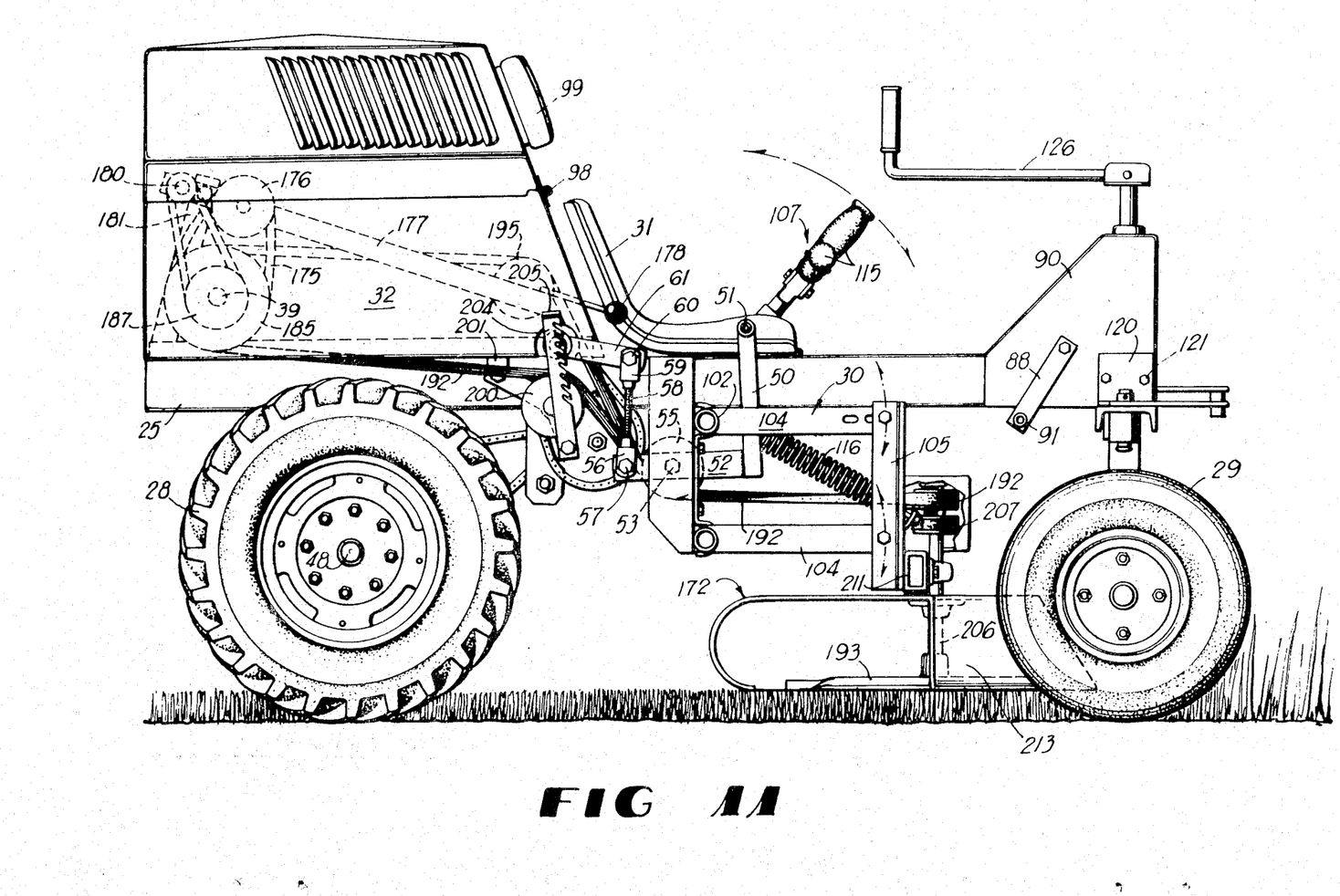
FIG. 11 is a similar view of the tractor with a lawn mowing attachment mounted thereon.
Figure 12:
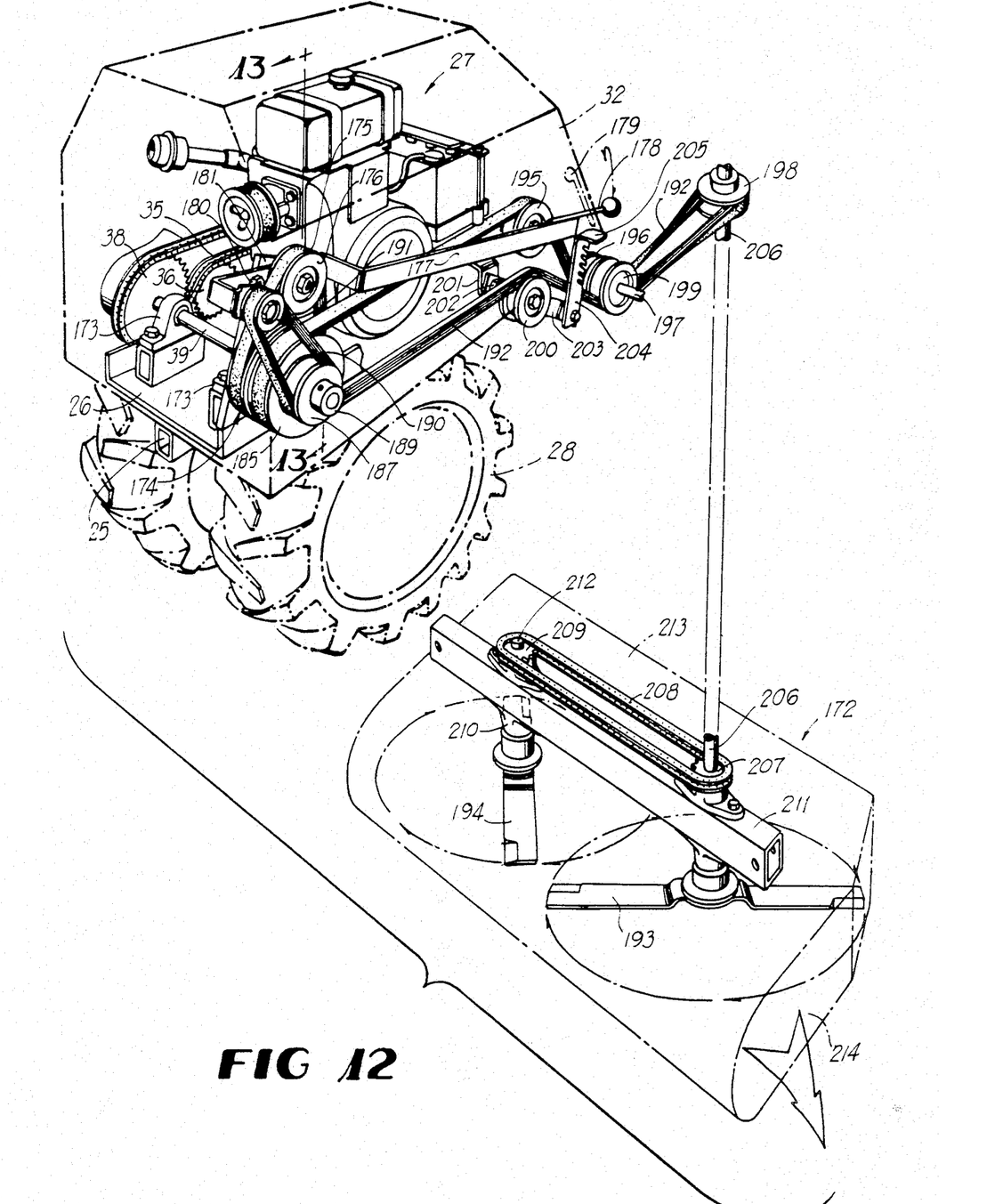
FIG. 12 is an exploded perspective view showing a power take-off drive for the lawn mowing attachment.
Figure 13:
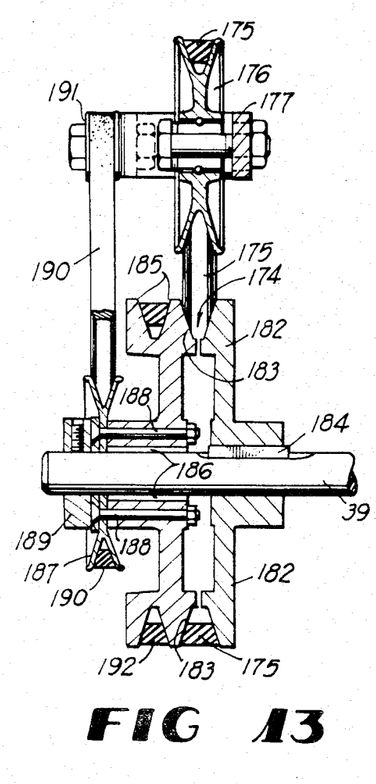
FIG. 13 is a fragmentary vertica section taken on line 13—13 of FIG. 12.
Figure 14:
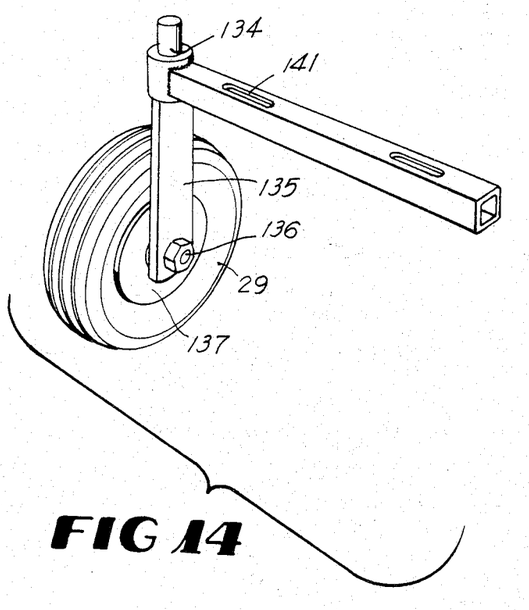
FIG. 14 is a fragmentary exploded perspective view depicting a modification of the tractor steering mechanism and front wheel tread adjustment.

The final attachment for the tractor shown in FIGS. 11-13 is a lawnmower attachment designated by the numeral 172. Unlike the previous attachment implements, the mower attachment utilizes a power take-off drive from the tractor engine 27 to power the mower blades. Referring to FIGS. 12 and 13, the previously described forward motion shaft 39 driven by sprocket 38 is journaled on pillow blocks 173, as shown. An engage motion pulley 174 journaled on the shaft 39 is engaged by a V-belt 175 which overlies an idler pulley 176 fixed to an engage/disengage lever 177. This lever is provided with a handle 178 which rides in a slot 179 formed in the engine cowling 32. The lever 177 is pivoted at 180 to a fixed stanchion 181 on the sub-frame 26.

The pulley 174 is divided into two halves 182 and 183, the former being keyed at 184 to the shaft 39. The latter pulley half 183 is molded as an integral part of a second pulley 185 which is free to rotate on the shaft 39 via a bushing 186. A third and smaller pulley 187 is fixed to the pulley 185 by bolts 188 and the shaft 39 carries a retaining collar 189 to retain the journaled pulley assembly formed by the union of pulley half 183, full pulley 185 and stop motion pulley 187. The pulley 187 is engaged by a belt 190 which in turn engages a bolted non-rotating pulley 191. The pulley 185 is engaged by a belt 192 which is the driving belt for the blades 193 and 194 of the mower attachment.

In operation, when the forward end of lever 177 is pivoted upwardly the stop belt 190 disengages and the belt 175 imparts rotation from the keyed pulley half 182 of composite pulley 174 and thereby imparts rotation to the free-to-rotate pulley half 183, thus imparting movement to the tool driving belt 192. This belt 192 drives the mower attachment and is guided in its path by a fixed idler pulley 195, then engaging under a sheave 196 journaled on a shaft 197 and then traveling around drive pulley 198 of the mower attachment and then back under an idler pulley 199 adjacent to sheave 196 on shaft 197, and finally, over take-up sheave 200. This take-up sheave is pivoted on a bracket 201 at 202 and a lever 203 is bolted to a notched control arm 204 having a handle 205 by means of which slack take-up pulley 200 can be raised at required times to remove slack from the drive belt. The handle 205, when lifted, can be engaged over a pin, not shown, which pin enters one of the notches of the control arm 204 to releasably lock it.

The drive pulley 198 powers a shaft 206 driving one mower blade 193. A sprocket 207 fixed on shaft 206 and engaged by chain 208 drives a second sprocket 209 journaled at 210 on the mower frame 211. The sprocket 209 drives a second mower shaft 212 which operates the second mower blade 194. A housing 213 encloses the blades 193 and 194. An exit chute 214 for cuttings is provided on the housing.

Figure 15:
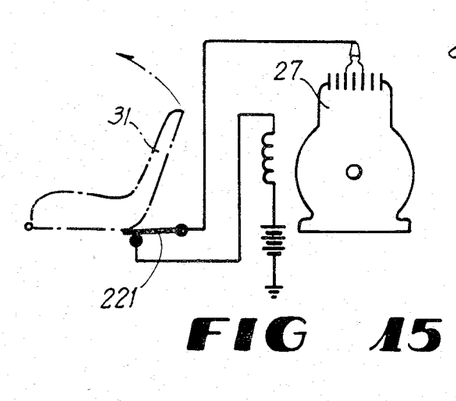
FIG. 15 is a schematic view of an optional seat pressure responsive safety switch.

For additional safety, when desired, a seat pressure actuated switch 221 beneath the seat 31, FIG. 15, is provided. When the operator is seated the ignition circuit to the engine 27 is closed and the engine can be started. When the operator of the tractor leaves the seat without shutting off the engine by means of the manual ignition switch, the seat switch 221 will shut off the engine automatically.

Figure 16:
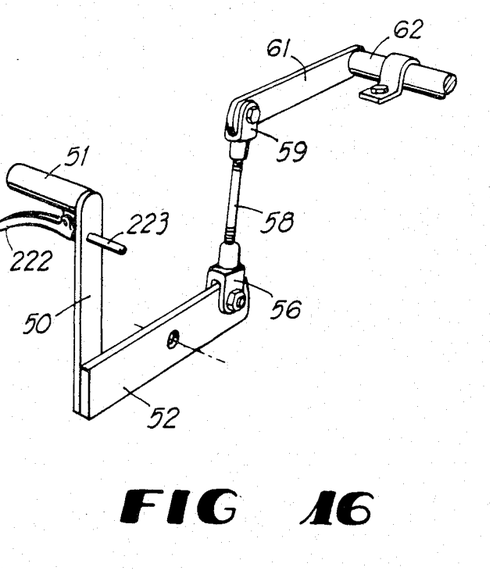
FIG. 16 is a fragmentary perspective view of a locking means for holding a forward and reverse clutch operating lever in a neutral position.

Another optional feature is shown in FIG. 16. This feature comprises a safety neutral lock for the forward and reverse selector lever 50 having handle 51, previously described. For this purpose, a squeeze lever 222 below the handle 51 operates a retractable lock pin 223 which can engage a fixed frame member not shown having a locking aperture corresponding to the neutral position of lever 50. This feature prevents the lever 50 from being accidentally displaced where the tractor engine continues to run while the tractor is stationary.

It can be seen that a highly versatile and convenient garden tractor having lawnmowing capability is provided. Diverse cultivating implements can be quickly mounted and demounted on the implement lift or mount 30 by the mere manipulation of two bolts. All implements are in full view of the operator due to the rear mounted engine and the forward position of the diverse implement mount. Steering is simplified and positive. Easy and flexible control of the tractor is provided by the fixed chain drive between the engine shaft 33 and rear traction wheel 28, while variable speed forward and reverse movement is instantly attainable through the unique intervening friction belt or clutch drive. The comfort and safety of the tractor operator are fully provided for in the invention. Heavy and costly gear transmission and differential gear devices are dispensed with. The many advantages of the invention should be readily apparent to those skilled in the art.

It is to be understood that the forms of the invention herewith shown and described are to be taken as preferred examples of the same, and that various changes in the shape, size and arrangement of parts maybe resorted to, without departing from the spirit of the invention or scope of the subjoined claims.

I claim:

1. A garden and lawn tractor comprising a main frame including a single high ground clearance center horizontal longitudinal frame bar and a single transverse axis frame bar secured to the longitudinal bar at right angles thereto and extending horizontally on opposite sides of the longitudinal bar, a single center traction wheel assembly beneath and supporting the rear end portion of the longitudinal frame bar, an engine and engine driven drive gearing mounted on top of the rear end portion of said longitudinal frame bar and being disposed above the traction wheel assembly and being drivingly connected with the rear traction wheel assembly, a driver-controlled variable forward and reverse friction belt drive connected in said drive gearing and being operable for selectively drive said traction wheel assembly in forward and reverse modes at different speeds, a driver's seat on said longitudinal bar immediately forwardly of said engine and drive gearing and near the longitudinal center of the longitudinal bar, a parallelogram mount and lift for diverse implements secured to said transverse axis frame bar and including a driver-operated lever adjacent to one side of said seat to raise and lower said parallelogram mount and lift, said mount and lift being disposed substantially bodily below the elevation of the horizontal longitudinal and transverse frame bars and substantially below said seat, and a pair of front wide stance independently laterally adjustable steering wheels and steering wheel support structure connected with and arranged below and supporting the forward end of said longitudinal frame bar and including a manual steering member in ready reach of a driver occupying said seat.

2. A garden and lawn tractor comprising a rigid main frame consisting of a single center horizontal longitudinal frame bar and a right angular horizontal transverse frame bar near the longitudinal center of the longitudinal frame bar and extending on opposite sides thereof, a diverse implement lift including a parallelogram linkage and a driver's vertically swingable operating lever suspended from the transverse horizontal bar and being disposed below the elevation of said rigid main frame and immediately forwardly of the horizontal transverse bar, a driver's seat on the main frame adjacent to the transverse horizontal bar, an engine on the rear end portion of said longitudinal frame bar, a traction wheel below the engine and longitudinal frame bar and supporting the latter, driver-controlled variable transmission means interconnecting an output shaft of the engine and said traction wheel, and wide stance laterally adjustable driver-controlling front steering wheel means connected with a supporting the forward end of said longitudinal frame bar and forming with said traction wheel a tricycle wheel configuration for the tractor.

* * * * *